United States Patent
Provost et al.

(10) Patent No.: US 7,627,220 B2
(45) Date of Patent: Dec. 1, 2009

(54) OPTICAL FIBER WITH HOLES

(75) Inventors: Lionel Provost, Dampart (FR); Gilles Melin, Orsay (FR); Laurent Gasca, Villebon-sur-Yvette (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/594,924

(22) PCT Filed: Apr. 1, 2005

(86) PCT No.: PCT/FR2005/000803
§ 371 (c)(1),
(2), (4) Date: Nov. 13, 2006

(87) PCT Pub. No.: WO2005/098494
PCT Pub. Date: Oct. 20, 2005

(65) Prior Publication Data
US 2007/0201801 A1 Aug. 30, 2007

(30) Foreign Application Priority Data
Apr. 2, 2004 (FR) .................................. 04 50665

(51) Int. Cl.
*G02B 6/032* (2006.01)
(52) U.S. Cl. ....................... 385/125; 385/123
(58) Field of Classification Search .................. None
See application file for complete search history.

(56) References Cited

U.S. PATENT DOCUMENTS

2002/0061176 A1* 5/2002 Libori et al. ................ 385/125
2003/0012535 A1* 1/2003 Town ......................... 385/125
2003/0190129 A1* 10/2003 Bassett et al. ............... 385/125
2005/0105867 A1* 5/2005 Koch et al. .................. 385/125

FOREIGN PATENT DOCUMENTS

EP 1426795 A2 * 6/2004

OTHER PUBLICATIONS

K. Saitoh et al, Chromatic Dispersion Control in Photonic Crystal Fibers: Application to Ultra-Flattened Dispersion, Optics Express, Optical Society of America, Washington DC. US, vol. 11, No. 8, Sep. 21, 2003, pp. 843-852, XP001188201.

* cited by examiner

*Primary Examiner*—Mike Stahl
(74) *Attorney, Agent, or Firm*—Sughrue Mion, PLLC

(57) ABSTRACT

The invention relates to optical fibers incorporating cavities in their structure.

This is an optical fiber comprising: a central core (1); a first annular region (ra) surrounding the central core (1); a second annular region (rb) surrounding the first annular region (ra) and comprising medium-size cavities (3) the cross section whereof remains strictly between a given first threshold and a given second threshold strictly higher than the first threshold; a third annular region (rc) surrounding the second annular region (rb) and comprising large cavities (4) the cross section whereof remains strictly above the second threshold; in a cross section of the optical fiber, any radius that goes from the center of the core towards the exterior of the optical fiber encounters at least either a medium-size cavity (3) in the second annular region (rb) or a large cavity (4) in the third annular region (rc); and the average distance between the outer perimeter (Ca) of the second annular region (rb) and the inner perimeter (Cb) of the third annular region (rc) is less than half the average dimension of a large cavity (4).

30 Claims, 6 Drawing Sheets

FIG_1

FIG_2

FIG_3

FIG_4

FIG_5

FIG_6

FIG_7

FIG_8

FIG_9

OPTICAL FIBER WITH HOLES

The invention relates to the field of optical fibers having cavities in their structure, better known as "optical fibers with holes". One of the major benefits of optical fibers with holes is the presence of cavities whose very low index significantly reduces the average index of the annular regions of the cladding including the cavities.

Optical fibers with holes represent the family of optical fibers of greatest benefit for the production of certain non-linear functions. A certain type of optical fiber with holes includes two layers of cavities, a layer closer to the center of the optical fiber and comprising mostly cavities of relatively small size, or even no cavities at all, the principal function of this inner layer being to influence the properties of the optical fiber, namely the effective area and the chromatic dispersion in particular, and a layer farther from the center of the optical fiber and comprising cavities of relatively large size, the principal function of this outer layer being to confine modes inside the optical fiber.

One of the major problems with optical fibers with holes is the high level of mode leakage losses. To some extent this problem is solved by complex and voluminous structures comprising in particular a large number of cavities that are relatively far apart, resulting in an overall size that quickly becomes large. In fact, it is known that the level of mode leakage losses is inversely proportional to the width of the set of layers comprising the cavities. Moreover, a single size of cavities in the outer layer is generally considered sufficient.

Examples of the above type of structure may be found in prior art documents including:

- the patents and patent applications US 2003/0012535; US 2002/0061176; US 2001/0031118; EP 1118887; EP 0810453; WO 03/019257; WO 02/084350; WO 01/98819; U.S. Pat. No. 6,539,155;
- the publications "Dispersion flattened hybrid-core non linear photonic crystal fiber", K. P. Hansen, Opt. Express 11, pages 1503-1509, 2003; "Chromatic dispersion control in photonic crystal fibers: application to ultra-flattened dispersion", K. Saitoh, M. Koshiba, T. Hasegawa, and E. Sasaoka, Opt. Express 11, pages 843-852, 2003.

The invention represents the polar opposite of the above prior art technique. It is aimed at a structure that is less bulky but more compact so as to achieve a high degree of confinement of modes in the optical fiber. At least two different sizes of cavities are judiciously disposed relative to each other in the outer layer so as to be able to cooperate with each other to increase confinement further at the same time as maintaining a reasonable overall size. It is a question of achieving a low level of confinement losses, i.e. mode leakage losses, for a restricted number of cavities, i.e. for only a few tens of cavities, typically fewer than 50 cavities.

The invention provides an optical fiber comprising: a central core; a first annular region surrounding the central core; a second annular region surrounding the first annular region and comprising medium-size cavities the cross section whereof remains strictly between a given first threshold and a given second threshold strictly higher than the first threshold; a third annular region surrounding the second annular region and comprising large cavities the cross section whereof remains strictly above the second threshold; characterized in that, in a cross section of the optical fiber: on the one hand, any radius that goes from the center of the core towards the exterior of the optical fiber encounters at least either a medium-size cavity in the second annular region or a large cavity in the third annular region; and, on the other hand, the average distance between the outer perimeter of the second annular region and the inner perimeter of the third annular region is less than half the average dimension of a large cavity. It is important that the structure of the cavities features no silica path to the outside through which the mode could leave the center of the optical fiber; this is why the compact and regular distribution in accordance with the invention, i.e. with no "silica corridor", i.e. with nowhere including no cavities or only a few cavities, is particularly beneficial. In a cross section of the optical fiber, the average distance between the outer perimeter of the second annular region and the inner perimeter of the third annular region is preferably less than one quarter the average dimension of a large cavity.

According to another aspect of the invention, for an application of the optical fiber consisting in obtaining a non-linear function with the aid of the optical fiber, there is also provided an optical fiber comprising: a central core (1); cladding (rb and rc) surrounding the central core (1) and comprising cavities (3, 4); and having, from 1530 nm to 1570 nm: an effective area less than or equal to 10 µm$^2$; an absolute value of the chromatic dispersion less than 3 ps/nm·km; characterized in that the cladding of the optical fiber comprises fewer than 70 cavities disposed in such a manner that the overall attenuation of the optical fiber remains less than 10 dB/km. The cladding of the optical fiber preferably comprises fewer than 50 cavities.

The invention will be better understood and other features and advantages of the invention will become apparent in the light of the following description and the appended drawings, which are provided by way of example, in which.

To improve the compromise between mode confinement in the structure of the optical fiber and the overall size of the structure of the optical fiber, at least ten of the large cavities in the third annular region are preferably situated in the same annular layer and each preferably has a ratio between its greatest dimension and the distance from the center of the cavity to the center of the core that is greater than 0.3. The space between two contiguous large cavities in the third annular region is advantageously less than the wavelength at which the optical fiber is used, which further improves mode confinement in the optical fiber. For practical implementation reasons, there are advantageously 12 large cavities in the same annular layer in the third annular region.

Again to improve the compromise between mode confinement in the structure of the optical fiber and the overall size of the structure of the optical fiber, at least ten of the medium-size cavities in the second annular region are preferably in the same annular layer and angularly offset relative to the large cavities so as to be situated facing the spaces between large cavities. For practical implementation reasons, there are advantageously 12 medium-size cavities in the same annular layer in the second annular region.

The first annular region preferably comprises small cavities whose cross section remains strictly below the first threshold. These small cavities modulate certain properties of the optical fiber such as the effective area or the chromatic dispersion, for example. In a cross section of the optical fiber, as any radius that goes from the center of the core towards the exterior of the optical fiber sweeps out an angular sector between two medium-size cavities in the second annular region, it preferably encounters at least one cavity in either the second annular region or the first annular region over at least a portion of the angular sector that it sweeps out. There is one small cavity between two contiguous medium-size cavities, for example. This small cavity does not need to cover all of the angular space situated between the two medium-size cavities, as it is the position rather than the size of the small cavities that enables them to cooperate with the other medium-size and large cavities to improve mode confinement in the optical fiber. To increase mode confinement at the same time as maintaining a reasonable overall size, the average distance between the outer perimeter of the first annular region and the inner perimeter of the second annular region is preferably less than half the average dimension of a medium-size cavity.

In one preferred embodiment of the invention, the second annular region and the third annular region are circular, their lattice being circular, and the first annular region is hexagonal, its lattice being triangular. This simplifies the fabrication of the preform from which the optical fiber with holes according to the invention is obtained by fiber drawing. This disposition increases the cavity density to the detriment of the silica density, which reduces the equivalent index and contributes to mode confinement in the optical fiber at the same time as further reducing the overall size.

The third annular region preferably includes only one layer of large cavities. The second annular region advantageously includes only one layer of medium-size cavities. However, these annular regions may also include more than one layer of cavities or cavities of different sizes.

The optical fiber with holes according to the invention is preferably a monomode optical fiber at the wavelength at which it is used. To this end, the greatest dimension of the whole of the structure of the optical fiber, i.e. the outside diameter of the third annular region in the case of a circular distribution, is limited. The maximum outside diameter permitted to maintain the monomode character of the optical fiber with holes depends on the precise structure of the optical fiber, i.e. among other things on the size and the disposition of the cavities. The greatest dimension of the whole of the structure of the optical fiber is preferably less than 30 µm, advantageously less than 25 µm, and even more advantageously less than 20 µm.

The optical fiber with holes according to the invention advantageously has a small effective area in order to increase the non-linear effects that occur in the central core of the optical fiber and thereby to accentuate any non-linear function that the optical fiber with holes may have. In the first annular region the cavities are preferably disposed so that the effective area of the optical fiber is less than 10 µm². In the first annular region the cavities are advantageously disposed so that the effective area of the optical fiber is less than 5 µm².

In order for said non-linear function to be as uniform as possible over a given spectral band, the chromatic dispersion is made as low as possible and as uniform as possible over said spectral band. The C band from 1530 nm to 1570 nm is a preferred band of use. Consequently, in the first annular region, the cavities are preferably disposed so that the absolute value of the chromatic dispersion of the optical fiber remains less than 3 ps/nm·km or even less than 1 ps/nm·km from 1530 nm to 1570 nm and even from 1500 nm to 1625 nm. In the first annular region, the cavities are disposed so that there is advantageously a zero dispersion wavelength from 1530 nm to 1570 nm.

Examples of functions, in particular non-linear functions, that an optical fiber with holes according to the invention may have are described next.

For example, in the first annular region, the cavities are disposed so that the distribution of the cavities in the first annular region has at most two axial symmetries and the optical fiber can therefore have a polarization maintaining function.

If its core is doped with a rare earth, the optical fiber with holes according to the invention may be used to produce a laser cavity or an amplifier.

If its core is doped with one or more of the elements germanium, phosphorus, lead, bismuth, lithium and niobium, the optical fiber with holes according to the invention may be used to produce a Raman amplifier.

The optical fiber with holes according to the invention may also be used to produce a wavelength converter device, a wavelength demultiplexer device, an optical regenerator device for optical signals or an optical filter device including a saturable absorber.

Examples of optical fibers with holes according to the invention and certain of the properties thereof are described next with reference to the figures. Generally speaking, in FIGS. 1 and 4 to 9 the cross section of the optical fiber represented features a core 1, a first annular region comprising at least small cavities 2, a second annular region comprising at least medium-size cavities 3 and a third annular region comprising at least large cavities 4. The annular regions may also include a certain quantity, generally a minority quantity, of cavities of a size different from that of the majority of the cavities of said annular region. The outer perimeter of an annular region is the circle circumscribed outside all the cavities of said annular region. The inner perimeter of an annular region is the circle inscribed inside all the cavities of said annular region. If the distribution of the cavities is not circular, for example if it is a hexagon, the perimeter will be the corresponding circumscribed or inscribed hexagon, and similarly for any other shape. In all the figures, the difference between the inner perimeter of the third annular region comprising the large cavities and the outer perimeter of the second annular region comprising the medium-size cavities is less than one quarter of the average diameter of a large cavity. If a cavity is circular, its average dimension is its diameter; if a cavity is not circular, its average dimension in a cross section of the optical fiber is the diameter of a disc with the same area. In the figures, the optical fiber sections feature perfectly circular cavities, which is not the case in practice, as the cavities may be deformed.

Figure 1:
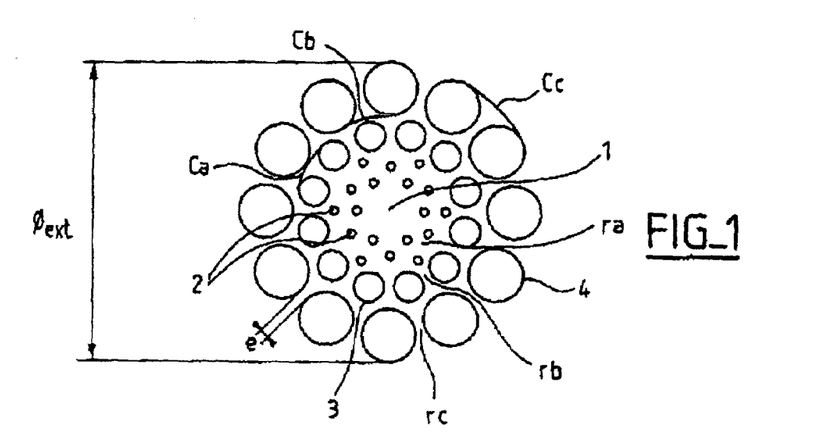
FIG. 1 is a diagram representing the section of one example of an optical fiber with holes according to the invention.

The FIG. 1 optical fiber features an undoped core 1, a first annular region ra comprising three hexagonal layers of six small cavities 2, a second annular region rb consisting of a circular layer of twelve medium-size cavities 3 and a third annular region rc consisting of a circular layer of twelve large cavities 4. All the small cavities 2 are the same size. Between two large cavities 4 there is a space e. Ca is the circle circumscribed outside the medium-size cavities 3 constituting the second annular region. Cb is the circle inscribed inside the large cavities 4 constituting the third annular region. Cc is the circle circumscribed outside the large cavities 4 constituting the third annular region. To clarify FIG. 1, only portions of the circles Ca, Cb and Cc are represented. The greatest dimension of the whole of the structure of the optical fiber is the outside diameter next of the ring of large cavities 4.

Figure 2:
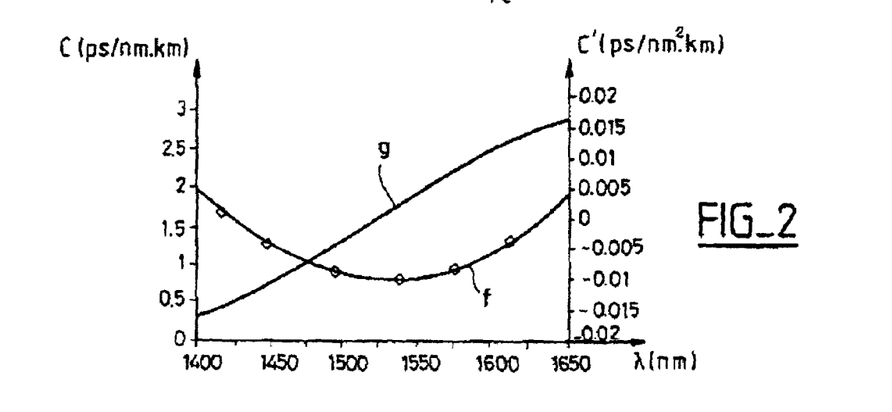
FIG. 2 is a diagram representing curves of chromatic dispersion and chromatic dispersion slope as a function of wavelength for the FIG. 1 optical fiber.

FIG. 2 is a diagram representing the curve f of the chromatic dispersion C in ps/nm·km and the curve g of the chromatic dispersion slope C' in ps/nm²·km as a function of the wavelength λ in nm for the FIG. 1 optical fiber. The absolute value of the chromatic dispersion remains less than 3 ps/nm·km over all spectral bands from 1400 nm to 1650 nm. The absolute value of the chromatic dispersion slope remains less than 0.01 ps/nm²·km over all spectral bands from 1400 nm to 1650 nm.

Figure 3:
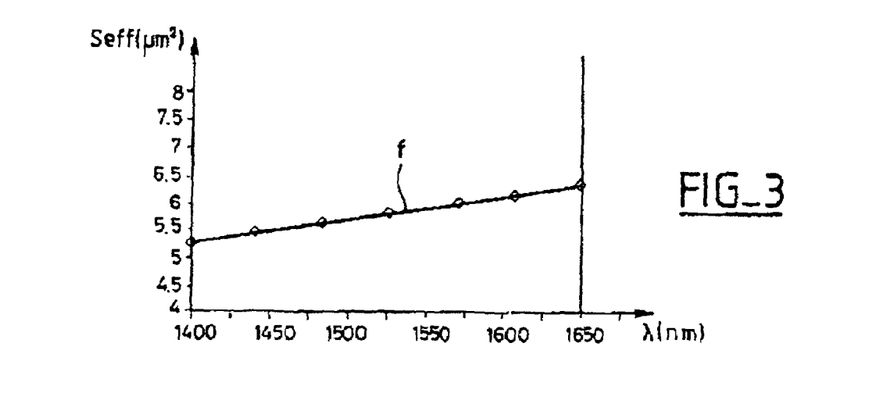
FIG. 3 is a diagram representing the curve of effective area as a function of wavelength for the FIG. 1 optical fiber.

FIG. 3 is a diagram representing the curve f of the effective area $S_{eff}$ in μm² as a function of the wavelength λ in nm for the FIG. 1 optical fiber. The effective area remains from 5 μm² to 6.5 μm² over all spectral bands from 1400 nm to 1650 nm.

Figure 4:
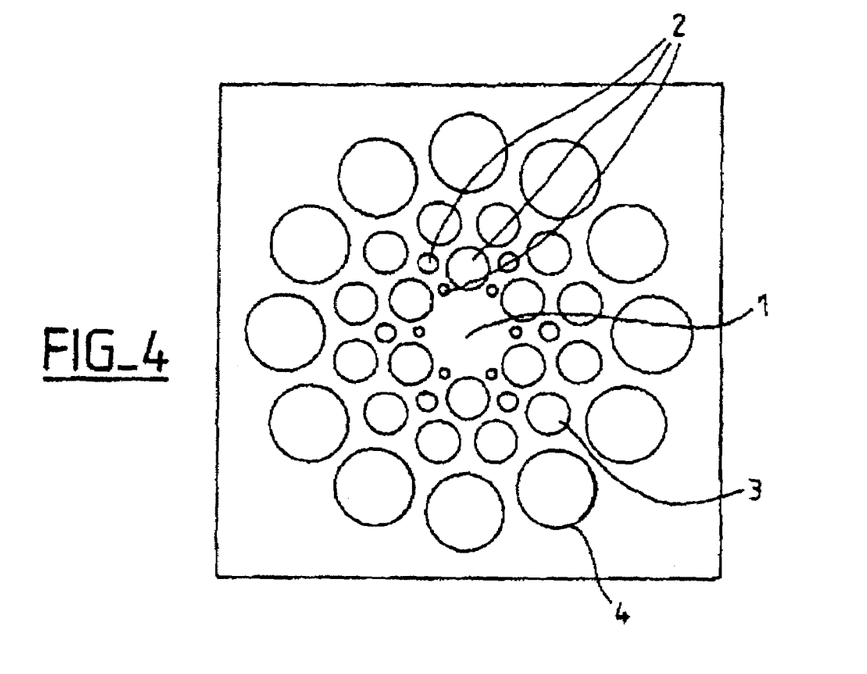
FIGS. 4 and 5 are diagrams representing the section of two other examples of optical fibers with holes according to the invention.

The FIG. 4 optical fiber features an undoped core 1, a first annular region comprising two hexagonal layers of six small cavities 2 and one hexagonal layer of six medium-size cavities 2, a circular layer of twelve medium-size cavities 3 and a circular layer of twelve large cavities 4. The small cavities 2 are of two different sizes.

Figure 5:
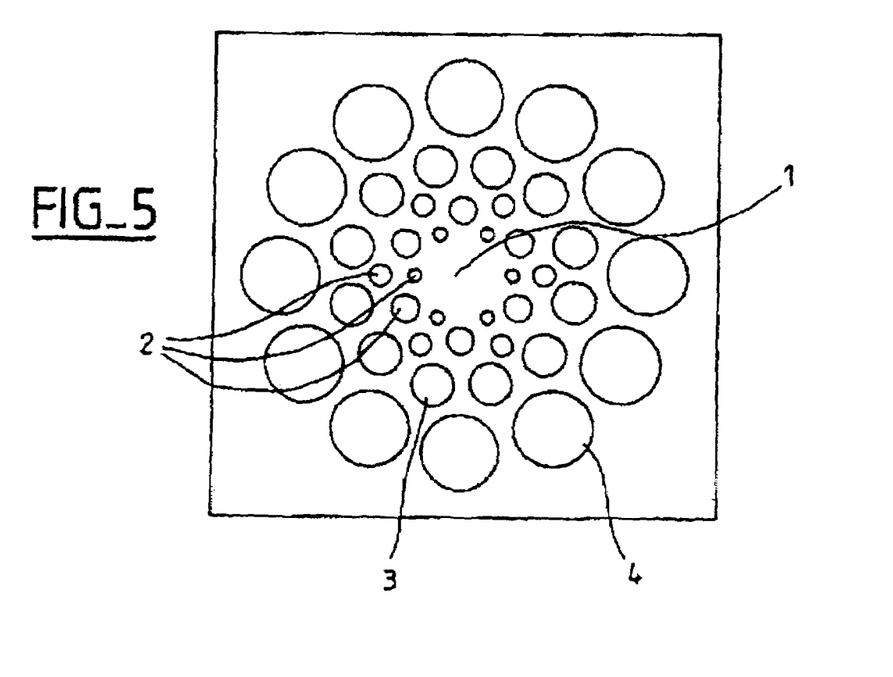

The FIG. 5 optical fiber features an undoped core 1, a first annular region comprising three hexagonal layers of six small cavities 2, a circular layer of twelve medium-size cavities 3 and a circular layer of twelve large cavities 4. The small cavities 2 are of three different sizes.

Figure 6:
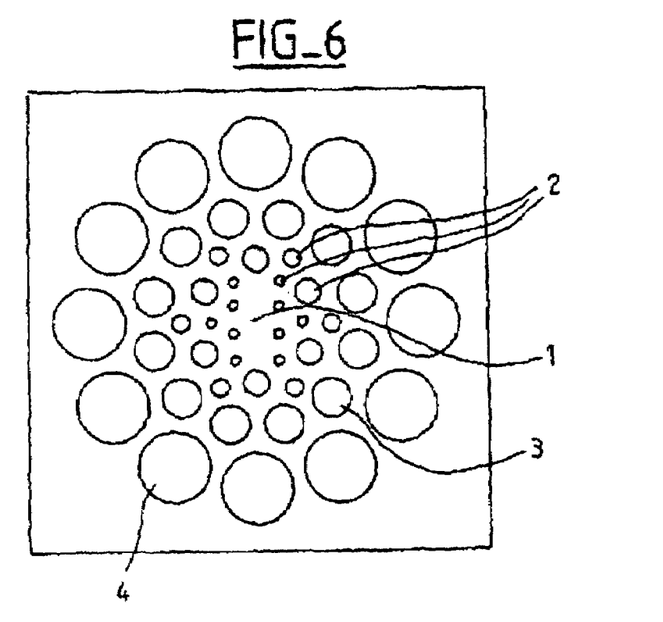
FIG. 6 is a diagram representing the section of one example of a polarization maintaining optical fiber with holes according to the invention.

The FIG. 6 optical fiber features an undoped core 1, a first annular region comprising small cavities 2, a circular layer of twelve medium-size cavities 3 and a circular layer of twelve large cavities 4. The small cavities 2 are of three different sizes and are so disposed that the structure has only two axes of symmetry, which makes this structure beneficial for the production of a polarization maintaining optical fiber.

Figure 7:
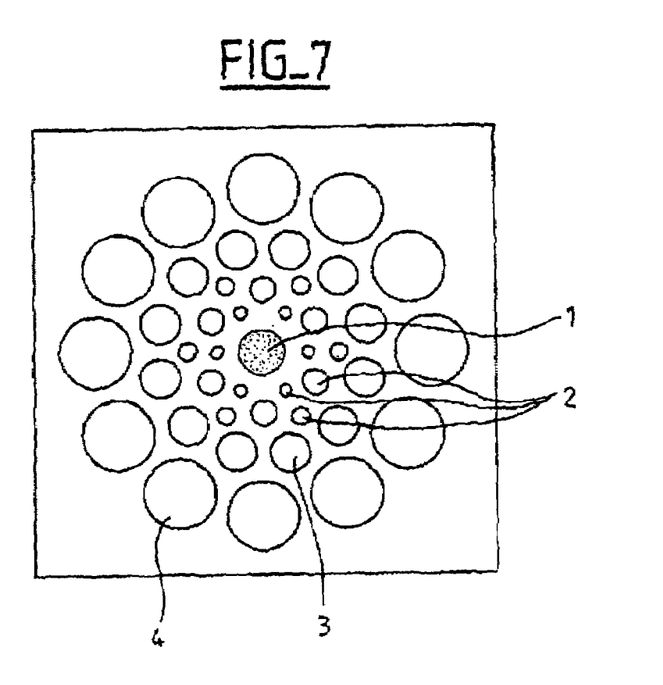
FIG. 7 is a diagram representing the section of one example of a doped optical fiber with holes according to the invention.

The FIG. 7 optical fiber features a doped core 1, a first annular region comprising three hexagonal layers of six small cavities 2, a circular layer of twelve medium-size cavities 3 and a circular layer of twelve large cavities 4. The small cavities 2 are of three different sizes. The other structures featured in the other figures could equally feature a doped core 1.

Figure 8:
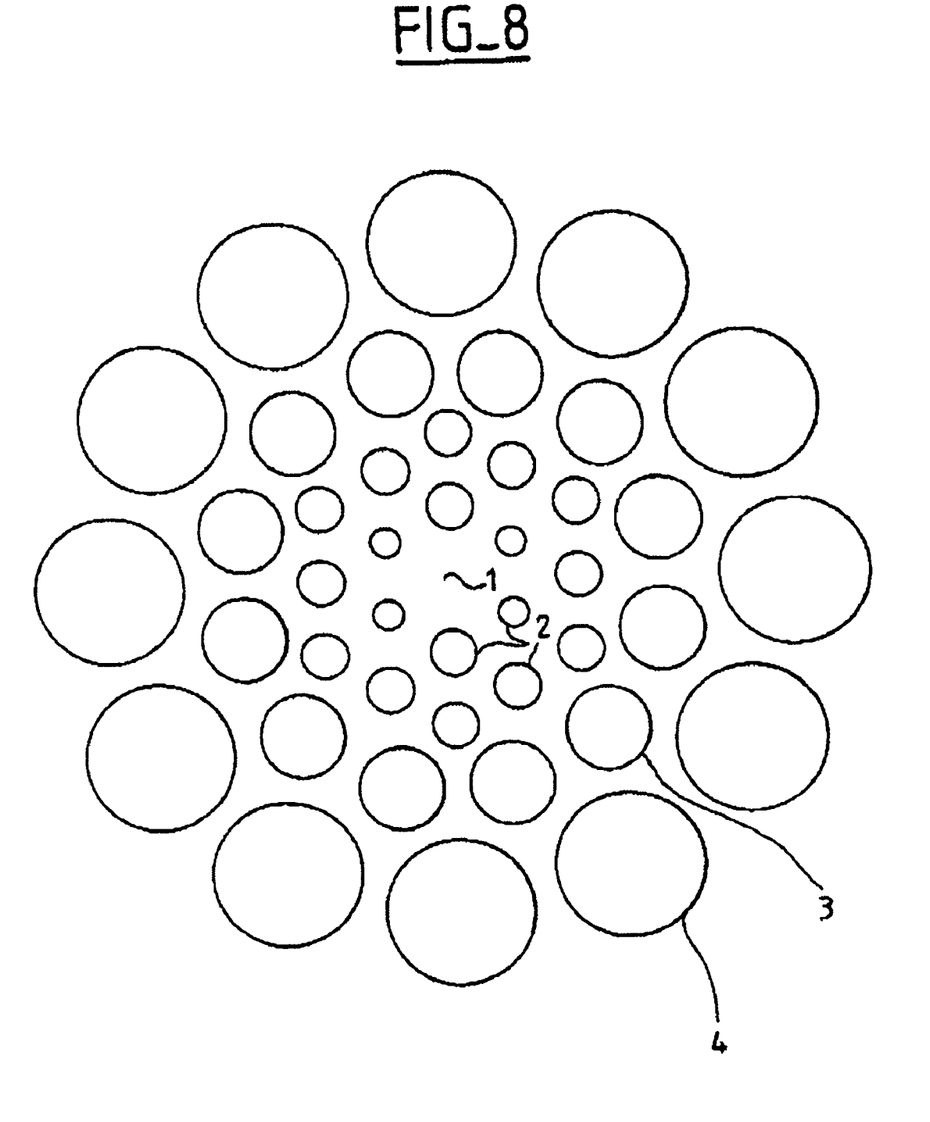
FIG. 8 is a diagram representing the section of another example of a polarization maintaining optical fiber with holes according to the invention.

The FIG. 8 optical fiber features an undoped core 1, a first annular region comprising small cavities 2, a circular layer of twelve medium-size cavities 3 and a circular layer of twelve large cavities 4. The small cavities 2 are of two different sizes and have an hexagonal disposition. The outside diameter of this structure is 15.9 μm. This optical fiber has a birefringence of approximately $3.5 \cdot 10^{-3}$. This optical fiber has an approximately zero chromatic dispersion for one of the two polarizations and an effective area of 3.6 μm² at a wavelength of 1550 nm.

Figure 9:
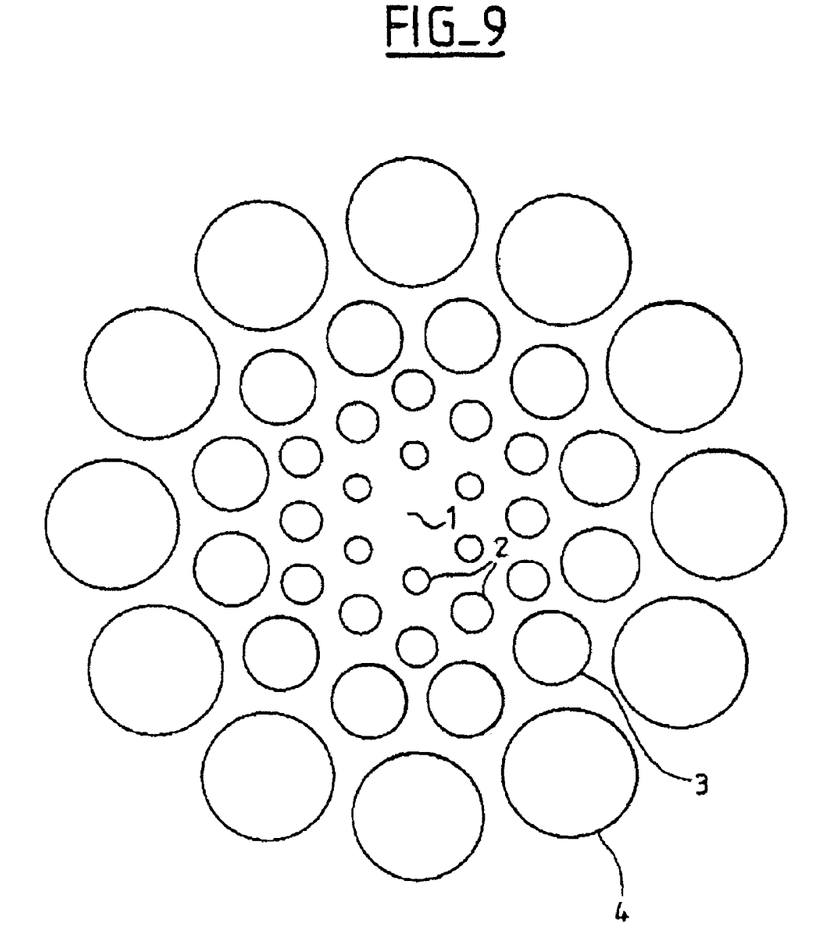
FIG. 9 is a diagram representing the section of another and particularly advantageous example of an optical fiber with holes according to the invention.

The FIG. 9 optical fiber features an undoped core 1, a first annular region comprising two hexagonal layers of six and twelve small cavities 2, respectively, a circular layer of twelve medium-size cavities 3 and a circular layer of twelve large cavities 4. The small cavities 2 are of two different sizes. The outside diameter of the structure is 14.8 μm. This optical fiber has a chromatic dispersion from 0 to 1 ps/nm·km over a range of wavelengths from 1500 nm to 1650 nm.

Figure 10:
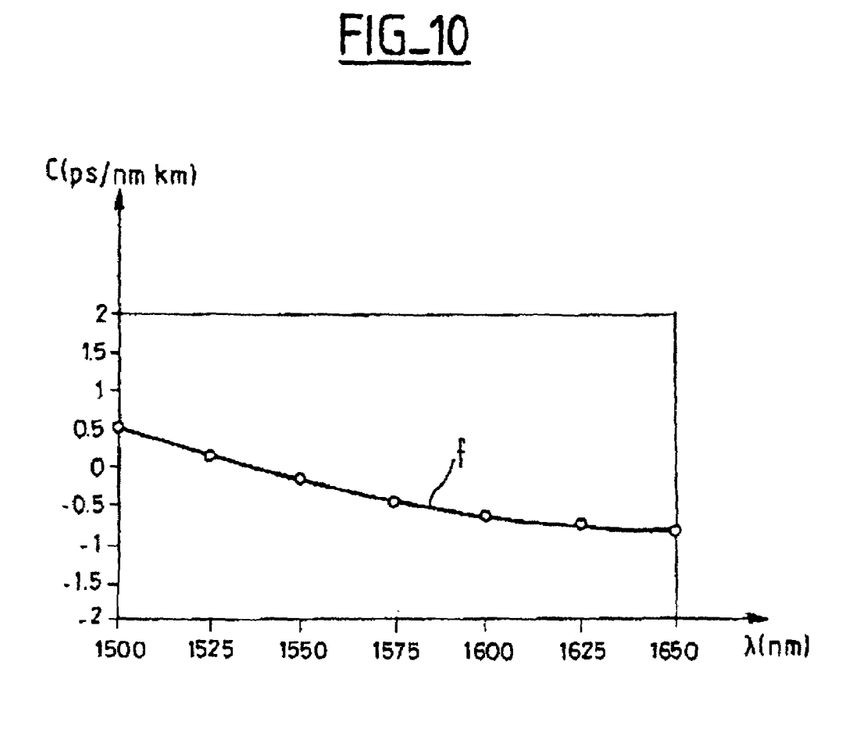
FIG. 10 is a diagram representing the curve of chromatic dispersion as a function of wavelength for the FIG. 9 optical fiber.

FIG. 10 is a diagram representing the curve of chromatic dispersion as a function of wavelength for the FIG. 9 optical fiber. The chromatic dispersion C in ps/nm·km is plotted on the ordinate axis and the wavelength λ in nm is plotted on the abscissa axis. The chromatic dispersion curve f remains below an absolute value of 1 ps/nm·km from 1500 nm to 1650 nm.

The invention claimed is:

1. Optical fiber comprising:
   a central core (1);
   a first annular region (ra) surrounding the central core (1);
   a second annular region (rb) surrounding the first annular region (ra) and comprising medium-size cavities (3) the cross section whereof remains strictly between a given first threshold and a given second threshold strictly higher than the first threshold;
   a third annular region (rc) surrounding the second annular region (rb) and comprising large cavities (4) the cross section whereof remains strictly above the second threshold;
   characterized in that, in a cross section of the optical fiber:
   any radius that goes from the center of the core towards the exterior of the optical fiber encounters at least either a medium-size cavity (3) in the second annular region (rb) or a large cavity (4) in the third annular region (rc); and
   the average distance between the outer perimeter (Ca) of the second annular region (rb) and the inner perimeter (Cb) of the third annular region (rc) is less than half the average dimension of a large cavity (4); and
   wherein the optical fiber is characterized in that the arrangement of the cavities in the second annular region (rb) and the arrangement of the cavities in the third annular region (rc) are circular and the arrangement of the cavities in the first annular region (ra) is hexagonal.

2. Optical fiber according to claim 1, characterized in that, in a cross section of the optical fiber, the average distance between the outer perimeter (Ca) of the second annular region (rb) and the inner perimeter (Cb) of the third annular region (rc) is less than one quarter the average dimension of a large cavity (4).

3. Optical fiber according to claim 1, characterized in that the first annular region (ra) comprises small cavities (2) the cross section whereof remains strictly below the first threshold.

4. Optical fiber according to claim 3, characterized in that, in a cross section of the optical fiber, when any radius that goes from the center of the core toward the exterior of the optical fiber sweeps out an angular sector between two medium-size cavities (3) in the second annular region (rb) it encounters at least one cavity (2, 3) either in the second annular region (rb) or in the first annular region (ra) over at least a portion of the angular sector that it sweeps out.

5. Optical fiber according to claim 4, characterized in that, in a cross section of the optical fiber, the average distance between the outer perimeter of the first annular region (ra) and the inner perimeter of the second annular region (rb) is less than half the average dimension of a medium-size cavity (3).

6. Optical fiber according to claim 1, characterized in that at least ten of the large cavities (4) in the third annular region (rc) are in the same annular layer and each has a ratio between its greatest dimension and the distance from the center of the cavity (4) to the center of the core that is greater than 0.3.

7. Optical fiber according to claim 6, characterized in that at least ten of the medium-size optical cavities (3) in the second annular region (rb) are in the same annular layer and angularly offset relative to the large cavities (4) in such a manner as to face the spaces (e) between the large cavities (4).

8. Optical fiber according to claim 1, characterized in that the space (e) between two contiguous large cavities (4) in the third annular region (rc) is less than the wavelength at which the optical fiber is used.

9. Optical fiber according to claim 1, characterized in that, in a cross section of the optical fiber, the greatest dimension ($\phi_{ext}$) of the whole of the structure of the optical fiber is less than 30 µm.

10. Optical fiber according to claim 9, characterized in that, in a cross section of the optical fiber, the greatest dimension ($\phi_{ext}$) of the whole of the structure of the optical fiber is less than 25 µm.

11. Optical fiber according to claim 10, characterized in that, in a cross section of the optical fiber, the greatest dimension ($\phi_{ext}$) of the whole of the structure of the optical fiber is less than 20 µm.

12. Optical fiber according to claim 1, characterized in that cavities (2) in the first annular region (ra) are disposed in such a manner that the effective area of the optical fiber is less than 10 µm$^2$.

13. Optical fiber according to claim 12, characterized in that cavities (2) in the first annular region (ra) are disposed in such a manner that the effective area of the optical fiber is less than 5 µm$^2$.

14. Optical fiber according to claim 1, characterized in that cavities (2) in the first annular region (ra) are disposed in such a manner that the absolute value of the chromatic dispersion of the optical fiber remains less than 3 ps/nm.km from 1530 nm to 1570 nm.

15. Optical fiber according to claim 14, characterized in that cavities (2) in the first annular region (ra) are disposed in such a manner that the absolute value of the chromatic dispersion of the optical fiber remains less than 3 ps/nm.km from 1500 nm to 1625 nm.

16. Optical fiber according to either claim 14, characterized in that cavities (2) in the first annular region (ra) are disposed in such a manner that the absolute value of the chromatic dispersion of the optical fiber at 1550 nm remains less than 1 ps/nm.km.

17. Optical fiber according to claim 16, characterized in that cavities (2) in the first annular region (ra) are disposed in such a manner that the absolute value of the chromatic dispersion of the optical fiber remains less than 1 ps/nm.km from 1500 nm to 1625 nm.

18. Optical fiber according to claim 1, characterized in that cavities (2) in the first annular region (ra) are disposed in such a manner that there is a zero dispersion wavelength from 1530 nm to 1570 nm.

19. Optical fiber according to claim 1, characterized in that the core (1) is doped with a rare earth.

20. Laser cavity comprising an optical fiber according to claim 18.

21. Amplifier comprising an optical fiber according to claim 18.

22. Optical fiber according to claim 1, characterized in that the core is doped with one or more of the elements germanium, phosphorus, lead, bismuth, lithium and niobium.

23. Raman amplifier device comprising an optical fiber according to claim 22.

24. Wavelength converter device comprising an optical fiber according to claim 1.

25. Wavelength demultiplexer device comprising an optical fiber according to claim 1.

26. Optical regenerator device for optical signals, comprising an optical fiber according to claim 1.

27. Optical filter device including a saturable absorber and comprising an optical fiber according to claim 1.

28. Optical fiber comprising:
a central core (1);
cladding (rb and rc) surrounding the central core (1) and comprising cavities (3, 4);
and having, from 1530 nm to 1570 nm:
an effective area less than or equal to 10 µm$^2$;
an absolute value of chromatic dispersion less than 3 ps/nm.km;
characterized in that the cladding of the optical fiber comprises fewer than 50 cavities disposed in such a manner that the overall attenuation of the optical fiber remains less than 10 dB/km.

29. Optical fiber according to claim 6, characterized in that there are 12 large cavities (4) in the same annular layer in the third annular region (rc).

30. Optical fiber according to claim 7, characterized in that there are 12 medium-size cavities (3) in the same annular layer in the second annular region (rb).

* * * * *